(12) United States Patent
Yang et al.

(10) Patent No.: US 12,061,792 B1
(45) Date of Patent: Aug. 13, 2024

(54) METHOD OF HANDLING HOST WRITE COMMANDS REQUESTING TO WRITE DUMMY PATTERN ON FLASH MEMORY AND RELATED MEMORY CONTROLLER AND STORAGE SYSTEM

(71) Applicant: Silicon Motion, Inc., Hsinchu County (TW)

(72) Inventors: Meng-Hua Yang, Hsinchu County (TW); Chia-Chi Liang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/122,134

(22) Filed: Mar. 16, 2023

(51) Int. Cl.
*G06F 3/06* (2006.01)
*G06F 12/1009* (2016.01)

(52) U.S. Cl.
CPC .......... *G06F 3/0607* (2013.01); *G06F 3/0659* (2013.01); *G06F 3/0679* (2013.01); *G06F 12/1009* (2013.01)

(58) Field of Classification Search
CPC .... G06F 3/0607; G06F 3/0659; G06F 3/0679; G06F 12/1009
See application file for complete search history.

(56) References Cited

U.S. PATENT DOCUMENTS

2010/0250831 A1* 9/2010 O'Brien .............. G06F 11/3433
711/170

* cited by examiner

*Primary Examiner* — Jae U Yu
(74) *Attorney, Agent, or Firm* — Winston Hsu

(57) ABSTRACT

A method for use in a flash memory to handle host write commands includes: performing a dummy pattern detection while programing data into a specific section of a first block or a first super block of the flash memory; setting a dummy pattern indicator if all the data that is programmed to the specific section of the first block or the first super block of the flash memory corresponds to a predetermined dummy pattern; and in response to host write commands, modifying a host-to-flash (H2F) address mapping table regarding data that is requested by the host write commands to be programmed to a second block or a second super block of the flash memory without programming the data into the second super block or the second block to complete the host write commands if the dummy pattern indicator is set.

15 Claims, 5 Drawing Sheets

METHOD OF HANDLING HOST WRITE COMMANDS REQUESTING TO WRITE DUMMY PATTERN ON FLASH MEMORY AND RELATED MEMORY CONTROLLER AND STORAGE SYSTEM

BACKGROUND OF THE INVENTION

1. Field of the Invention

The present invention relates to flash memory, and more particularly, to method for handling host write commands requesting to write dummy pattern on a flash memory and a related memory controller and a storage system thereof.

2. Description of the Prior Art

In computer systems, disk cloning software is relied upon to realize a 1-to-1 copy of a hard disk drive (HDD) or solid-state drive (SSD), which can be used for upgrading a disk or replacing an aging disk with a fresh one. Some kind of disk cloning software, however, may write dummy pattern of data, such as all "0" or "0xFF" to a target disk when cloning a section of a source disk that does not include any data. In view of this, there is a need to provide a method to improve efficiency of cloning sections of disk that does not contain any useful information.

SUMMARY OF THE INVENTION

With this in mind, it is one object of the present invention to provide a mechanism for flash memory to deal with host write commands. Embodiments of the present invention detects whether received host write commands are directed to writing data of dummy pattern (e.g. all "0" or all "0xFF" values) to the flash memory. If so, a memory controller provided by the present invention would not perform any memory write operation on the flash memory. Instead, the memory controller may modify host-to-flash (H2F) mapping table to record the data that is requested by the host write commands is invalid data.

According to one embodiment, a method for use in a flash memory to handle host write commands is provided. The method comprises: performing a dummy pattern detection while programing data into a specific section of a first block or a first super block of the flash memory; setting a dummy pattern indicator if all the data that is programmed to the specific section of the first block or the first super block of the flash memory corresponds to a predetermined dummy pattern; and in response to host write commands, modifying a host-to-flash (H2F) address mapping table regarding data that is requested by the host write commands to be programmed to a second block or a second super block of the flash memory without programming the data into the second super block or the second block to complete the host write commands if the dummy pattern indicator is set.

According to one embodiment of the present invention, a memory controller for use in a flash memory to control operations of the flash memory and handle host write commands is provided. The memory controller comprises: a storage unit and a processing unit. The storage unit is configured to store information. The processing unit is configured to execute program codes and information stored in the flash memory or in the storage unit so as to perform an operation of performing a dummy pattern detection while programing data into a specific section of a first block or a first super block of the flash memory; setting a dummy pattern indicator if all the data that is programmed to the specific section of the first block or the first super block of the flash memory corresponds to a predetermined dummy pattern; and in response to host write commands, modifying a host-to-flash (H2F) address mapping table regarding data that is requested by the host write commands to be programmed to a second block or a second super block of the flash memory without programming the data into the second super block or the second block to complete the host write commands if the dummy pattern indicator is set.

According to one embodiment of the present invention, a storage device is provided. The storage device comprises: a flash memory; and a flash memory controller. The memory controller is configured to control the flash memory. The memory controller comprising: a storage unit and a processing unit. The storage unit is configured to store information. The processing unit is configured to execute program codes and information stored in the flash memory or in the storage unit so as to perform an operation of: performing a dummy pattern detection while programing data into a specific section of a first block or a first super block of the flash memory; setting a dummy pattern indicator if all the data that is programmed to the specific section of the first block or the first super block of the flash memory corresponds to a predetermined dummy pattern; and in response to host write commands, modifying a host-to-flash (H2F) address mapping table regarding data that is requested by the host write commands to be programmed to a second block or a second super block of the flash memory without programming the data into the second super block or the second block to complete the host write commands if the dummy pattern indicator is set.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment.

Furthermore, the particular features, structures or characteristics may be combined in any suitable combinations and/or sub-combinations in one or more embodiments.

Figure 1:
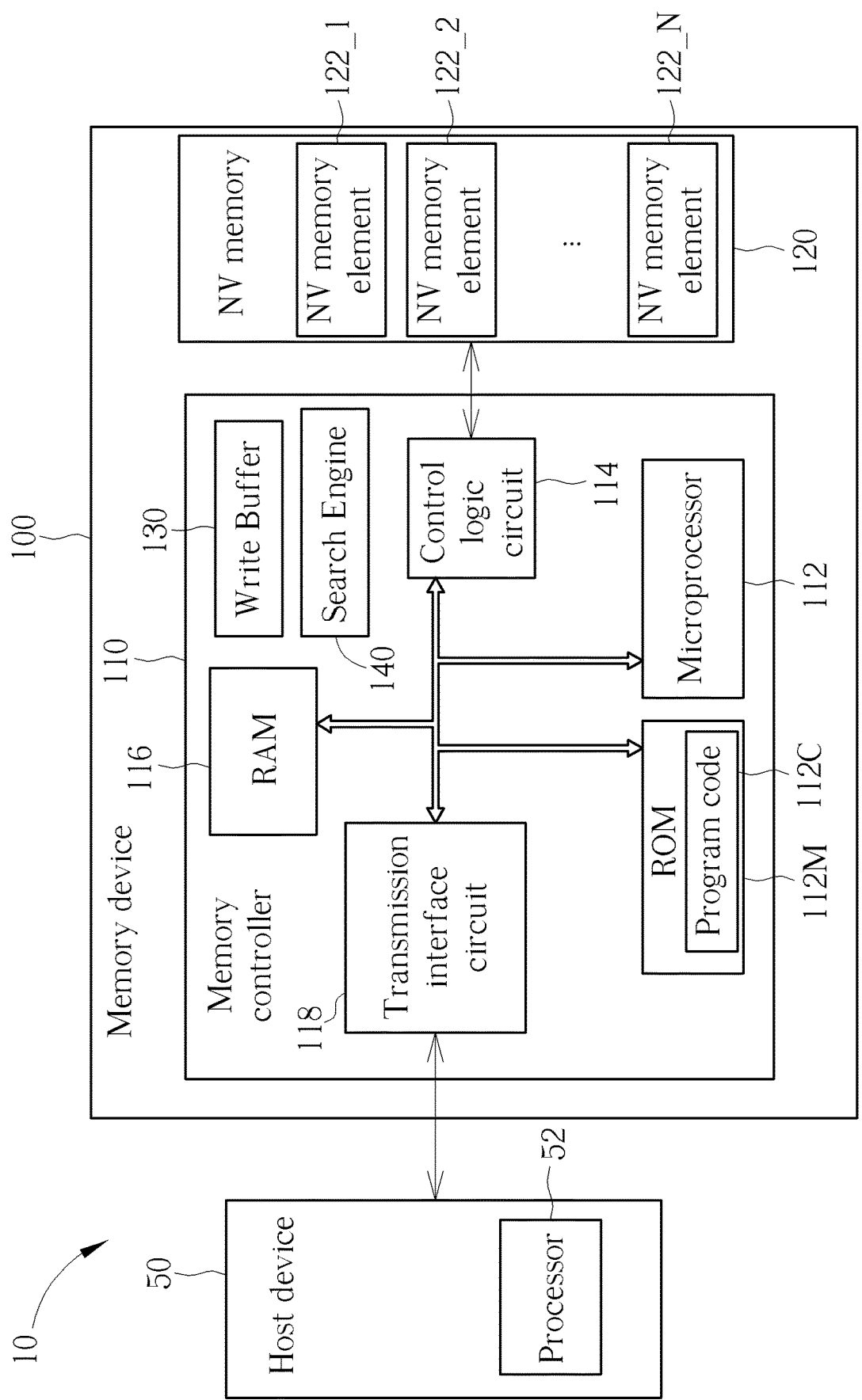
FIG. 1 illustrates a schematic diagram of a storage device including a memory controller according to one embodiment of the present invention.

FIG. 1 is a diagram illustrating an electronic device 10 according to an embodiment of the present invention, where the electronic device 10 comprises a host device 50 and a storage device 100. The host device 50 may comprise: at least one processor 52 configured to control operations of the host device 50. Examples of the host device 50 may include, but are not limited to: a smartphone, a tablet computer, a wearable device, a personal computer such as a desktop computer and a laptop computer, an imaging device such as a digital still camera or a video camera a game console, a car navigation system, a printer, a scanner or a server system. Examples of the storage device 100 may include, but are not limited to: a portable memory device (such as a memory card conforming to SD/MMC, CF, MS, XD or UFS specifications), a solid state drive (SSD) and various embedded storage device (such as an embedded storage device conforming to UFS or EMMC specifications).

According to various embodiments, the storage device 100 may comprise a controller such as a memory controller 110, and may further comprise a non-volatile (NV) memory 120. The NV memory 120 is configured to store information. The NV memory 120 may comprise at least one NV memory element (e.g. one or more NV memory elements), such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or may comprise memory cells having a three-dimensional structure.

Figure 2:
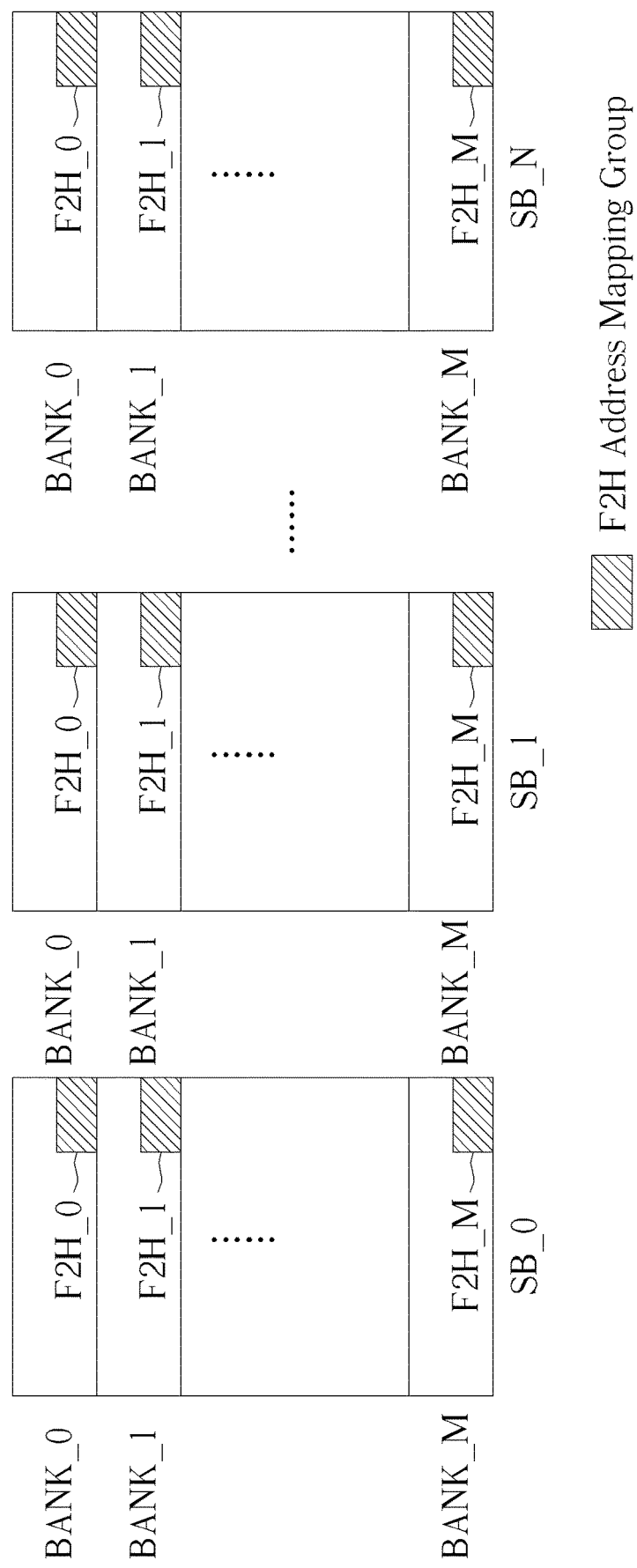
FIG. 2 illustrates structure of a super block and when to perform a dummy pattern detection according to one embodiment of the present invention.

As shown in FIG. 2, the memory controller 110 may comprise a processing circuit such as a microprocessor 112, a storage component such as a read-only memory (ROM) 112M, an internal memory 113, a control logic circuit 114, a transmission interface circuit 118, where at least one portion (e.g. a portion or all) of these components may be coupled to one another through a bus. The internal memory 113 is implemented by a random access memory (RAM), for example, the internal memory 113 may be a static RAM (SRAM) and/or a dynamic RAM (DRAM). The internal memory 113 may be configured to provide internal storage space to the memory controller 110, for example, temporarily storing information, such as, parameters, commands, data, addresses and/or mapping tables. In addition, the ROM 112M of this embodiment is configured to store a program code 112C, and the microprocessor 112 is configured to execute the program code 112C to control access of the NV memory 120. Alternatively, the program code 112C may be stored in the NV memory 120.

The memory controller 110 controls reading, writing and erasing of the NV memory 120 through a control logic circuit 114. In addition, the memory controller 110 could perform writing of user data based on host commands from the host device 50 and writing of valid data which is read from the NV memory 120 by the garbage collection and or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host 50 according to the specific communications specification.

Typically, the host device 50 may access the memory device 100, indirectly, through transmitting host commands and corresponding logic addresses to the memory controller 110. The memory controller 110 receives the host commands and the logical addresses, and translates the host commands to memory operation commands, and further controls the NV memory 120 with the memory operation commands to perform read, write or erase operations upon memory units or data pages having physical addresses within the NV memory 120, where the physical addresses corresponds to the logic addresses. When the memory controller 110 performs an erase operation on any NV memory element 122_$k$ within the plurality of NV memory elements 122_1-122_N, at least one block of the NV memory element 122_$k$ may be erased. In addition, each block of the NV memory element 122_$k$ may comprise multiple pages, and an access operation (e.g. read or write) may be performed on one or more pages.

In one embodiment, each one of NV memory elements 122_1-122_N could be a NV memory die (or chip). There is control circuitry on each one of NV memory dies 122_1-122_N for executing memory operation commands issued by the memory controller 110. In addition, each of the NV memory dies 122_1-122_N could comprise a plurality of planes. Each plane may comprise a number of blocks of memory cells and associated row and column control circuitry. The memory cells in each plane may be arranged in a 2D or 3D memory structure. Multiple operations may be performed in parallel (i.e., simultaneously) on memory blocks of different planes according to a multi-plane (e.g. read, program, erase) operation. The multi-plane operation may perform various processing operations on different planes simultaneously.

In one embodiment, the memory controller 110 may be configured to group memory blocks of NV memory 120 into a plurality of super blocks. In one embodiment, the super block may be formed across a plurality of NV memory chips 122_1-122_K. The super block may be configured as one or more memory blocks included in each of the NV memory chips NV memory chip 122_1-122_K.

In one embodiment of the present invention, a host-to-flash (H2F) address mapping table, which includes a plurality of H2F address mapping entries for performing logical to physical address translation will be divided into multiple mapping groups, each includes a part of mapping entries of the H2F table. These mapping groups are permanently stored in meta blocks of NV memory 120 and will be loaded to the internal memory 113 when necessary. Similarly, a flash-to-host (F2H) address mapping table, which includes a plurality of F2H address mapping entries for performing physical to logical address translation, will be divided into multiple mapping groups, each includes a part of mapping entries of the F2H table. These mapping groups are permanently stored in corresponding data blocks of NV memory 120 and will be loaded to the internal memory 113 when necessary.

In one embodiment, the memory controller 110 further comprises a write buffer 130, which may be provided by allocating a part of system RAM of the host device 50 or being a part of internal memory 113. The write buffer 130 is configured to temporarily store a portion of data that is requested by a host write command to be programmed to pages/super pages and/or blocks of the NV memory 120. Typically, the write buffer 130 would have a size of 384K bytes. In one embodiment, the memory controller 110 comprises a hardware search engine 140, which is operable to search for specific types of data patterns in the write buffer 130. In one embodiment, the search engine 140 may be configured to search for a value "0" or "0xFF" in the write buffer 130. If it is found all data in the write buffer 130 has value of "0" or has value of "0xFF", the memory controller 110 would determine the data in the write buffer 130 corresponds to a predetermined dummy pattern.

Accordingly, the memory controller 110 is configured to perform a dummy pattern detection each time when the memory controller 110 is programming data to a specific portion of a super block/a block. Please refer to FIG. 2, which illustrates timing when the memory controller 110 performs a dummy pattern detection according to one embodiment of the present invention. As shown by FIG. 2, the memory controller 110 could program data on super blocks (or just blocks) SB 0-SB N of the NV memory 120. For sake of management, each of the super blocks SB 0-SB N would be divided to into multiple banks BANK_0-BANK_M and each banks BANK_0-BANK_M of a super block comprises multiple pages or super pages. Typically, the memory controller 110 is configured to program data from pages or super pages of the BANK_0 to pages or super pages of BANK_M sequentially. In one embodiment, once the memory controller 110 start to writing data to pages or super pages of BANK_M (i.e., a last bank of a super block), the memory controller 110 would start to perform the dummy pattern detection each time a F2H mapping group is flushed from the internal memory 113 or the system RAM of the host device 50 to the NV memory 120, checking whether all the data in the write buffer 130 corresponds to a predetermined dummy pattern. If yes, the memory controller 110 would enter a dummy pattern handling process instead of performing a normal write operation. According to various embodiments, the memory controller 110 would start the dummy pattern detection at different timings. For example, the memory controller 110 may start the dummy pattern detection each time it is writing data to pages or super pages of BANK_0 or BANK_1 of the superblock, which would be different in different embodiments of the present invention.

Furthermore, a F2H address mapping table regarding a super block could be divided to multiple F2H address mapping groups. Each of F2H address mapping groups comprises a plurality of entries and is stored in a corresponding one of the banks of a super block. For example, a F2H address mapping table for the super block SB_0 could be divided into F2H address mapping groups F2H_0-F2H_M, each of which may include F2H address mapping entries regard data in the bank that the F2H address mapping group is stored. For example, the F2H address mapping group F2H_0 may include F2H address mapping entries regarding pages, super pages, or blocks in the bank BANK_0, the F2H address mapping group F2H_1 may include F2H address mapping entries regarding pages, super pages, or blocks in the bank BANK_1, and the F2H address mapping group F2H_M may include F2H address mapping entries regarding pages, super pages, or blocks in the bank BANK_M.

Figure 3:
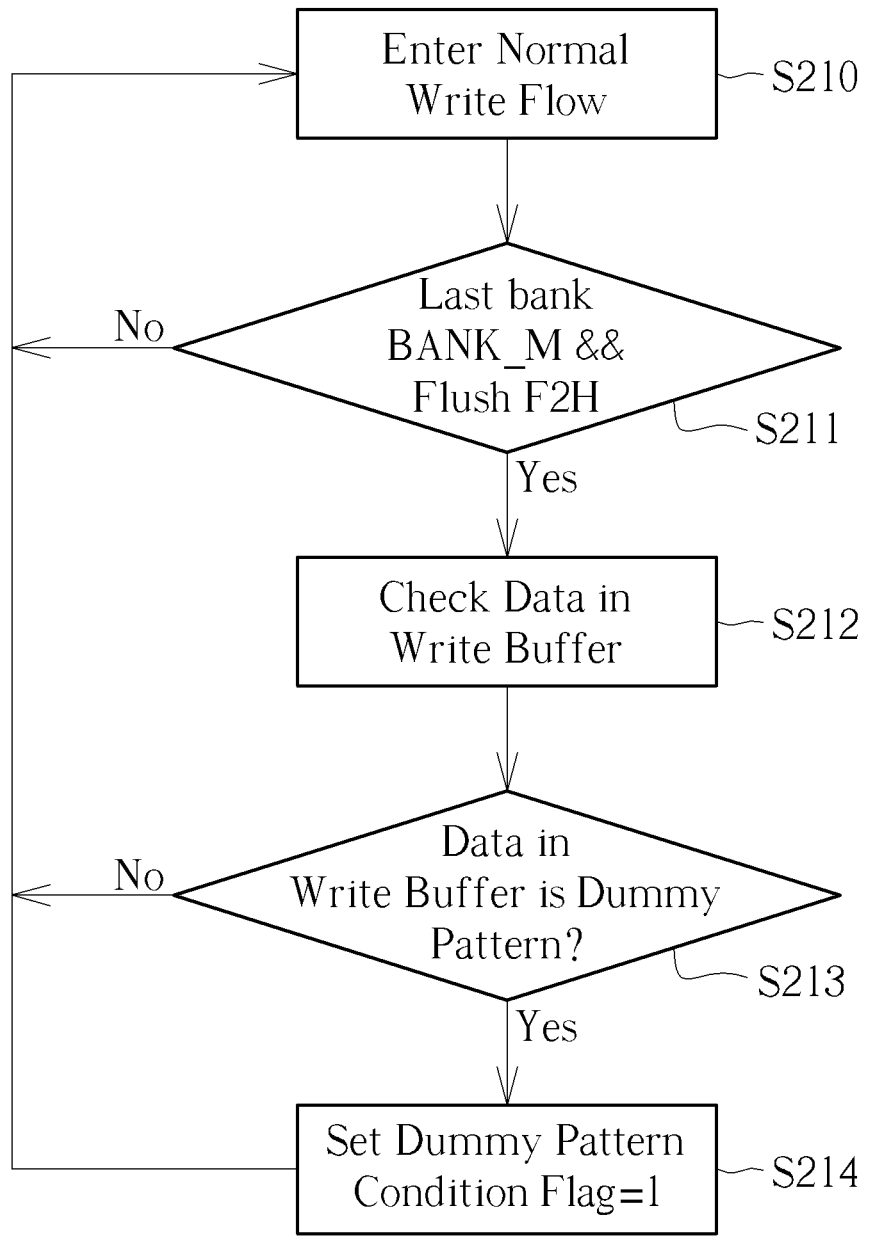
FIG. 3 illustrates a flow regarding a dummy pattern detection according to one embodiment of the present invention.

Please refer to FIG. 3, which illustrates a flow chart regarding a dummy pattern detection according to one embodiment of the present invention. At step S210, the memory controller 110 enters a normal write flow in response to host write commands if the dummy pattern handling process has not been started. At step S211, once the memory controller 110 start to write data that is requested by the host write commands to be programmed into a last one of sections of a super block or a block, it is checked whether data in the write buffer 130 corresponds to the predetermined dummy pattern each time F2H address mapping of a whole F2H address mapping table is flushed to the NV flash memory 120 (i.e., step S212). In one embodiment, the last one of sections of a super block or a block could be the last bank of the super block or the block (e.g. BANK_M of a super block). In one embodiment, the memory controller 110 is configured to flush the F2H address mapping (e.g. entries or groups) from the internal memory 113 or system RAM of the host device 50 to the NV memory 120 each time data of three pages or three super pages has been written to the NV memory 120. In one embodiment, if all of data has value of "0" or "0xFF", it would be determined as corresponding to the predetermined dummy pattern. In one embodiment, the memory controller 110 relies on the hardware search engine 140 to check whether all of data has value of "0" or "0xFF". At step S214, if it is found that the data in the write buffer 130 corresponds to the predetermined dummy pattern each time the F2H address mapping is flushed to the NV flash memory 120, a flag regarding the dummy pattern condition will be set to "1", which suggests a dummy pattern handling process can be started. However, if not every time the F2H address mapping is flushed, the data in the write buffer 130 corresponds to the predetermined dummy pattern, the flag will not be set as "1". In one embodiment, before checking whether the data in the write buffer 130 corresponds to the predetermined dummy pattern, the memory controller 110 would flush F2H address mapping from internal memory 113 or a system RAM of the host device 50 into the NV memory 120 and flush all the data in other buffers (not shown) of the memory controller 110.

Figure 4:
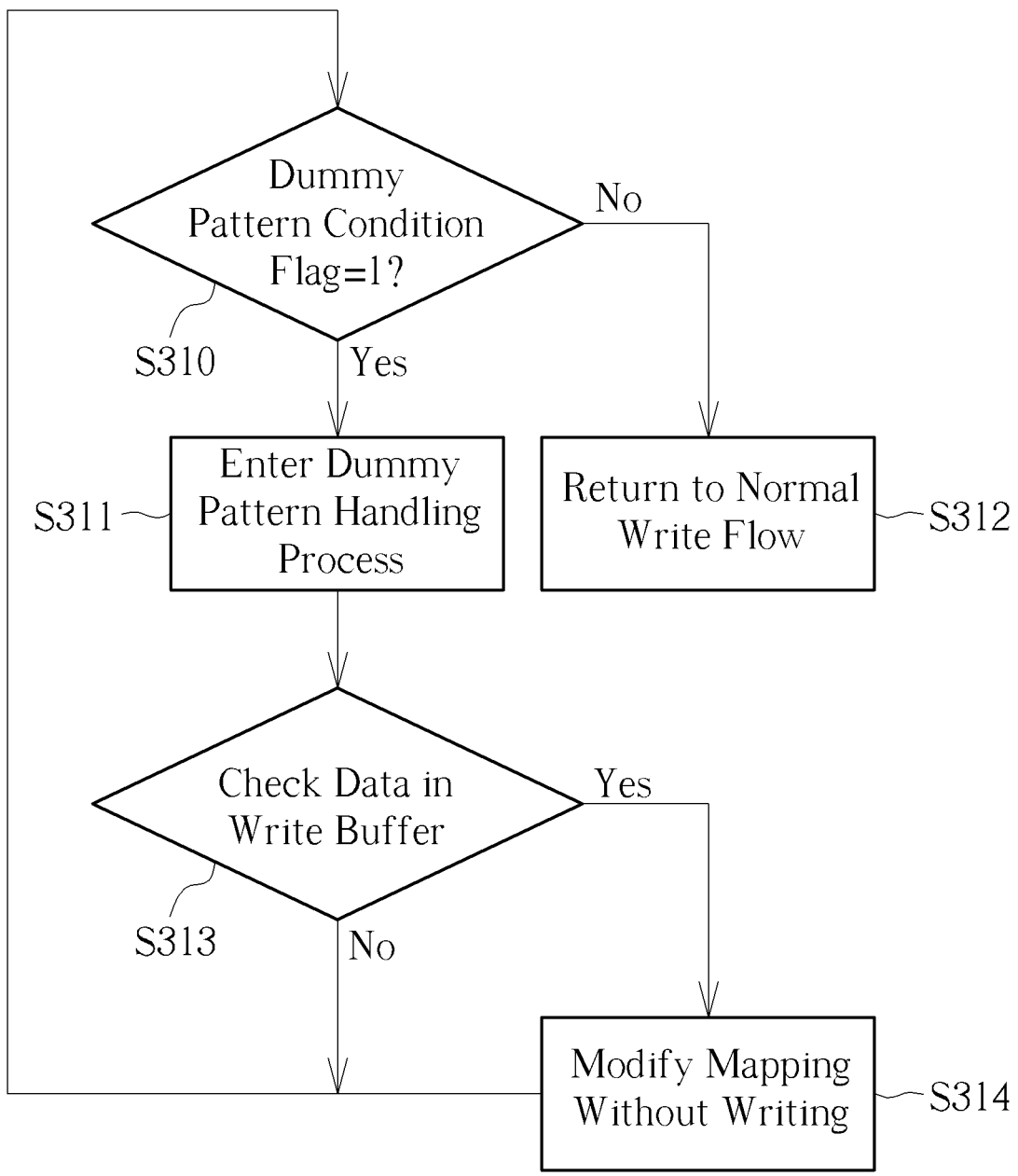
FIG. 4 illustrates a flow regarding a dummy pattern handling process according to one embodiment of the present invention.

Please refer to FIG. 4, which illustrates a flow chart regarding a dummy pattern handling process according to one embodiment of the present invention. Each time the memory controller 110 starts to write data to a new super block or a new block, this flow will be entered. At step S310, it is checked whether the flag regarding the dummy pattern condition is set to "1". If yes, the flow proceeds to step S311; otherwise, the flow goes to step 312, which allows to the memory controller 110 to return to the normal write flow (i.e., step S210). At step S311, the memory controller 110 would enter the dummy pattern processing flow. At step S313, the memory controller 110 would check whether data currently in the write buffer 130 corresponds to the predetermined dummy pattern. If yes, the flow goes to step S314; otherwise, leaving the flow. At step S314, the memory controller 110 would modify H2F address mapping regarding all the data that host write command requests to write instead of actually writing the data into the NV memory 120. Specifically, the memory controller 110 would modify one or more H2F address mapping entries to allow physical addresses of the data intended to be programmed to have an initial value (e.g., dummy value), thereby to complete the host write command. Once a new host write command is received, the memory controller 110 will again checked whether data currently in the write buffer 130 corresponds to the predetermined dummy pattern and determine either to modify the H2F address mapping or programing data to the NV memory 120 (if data in the write buffer 130 does not correspond to the predetermined dummy pattern).

In one embodiment, once the memory controller 110 determines to modify the H2F address mapping table, the memory controller 110 would check the H2F address mapping table to determine whether H2F address mapping entries that data is intended to be programmed correspond to have recorded physical addresses. If no, this means corresponding logical blocks does not exist. In such condition, the memory controller 110 would not load and modify the H2F address mapping and deems the host write command has been completed. If H2F address mapping entries that data is intended to be programmed correspond to have recorded physical addresses, a corresponding H2F address mapping group will be loaded to the internal memory 113 of the memory controller 110 or system RAM of the host device 50, the memory controller 110 would modify those physical addresses as an initial value. Afterwards, in response to a host read command, the memory controller 110 would feedback dummy data to the host device 50 if it is found data that the host read command requests to read has physical addresses of the initial value (by checking H2F address mapping table).

Figure 5:
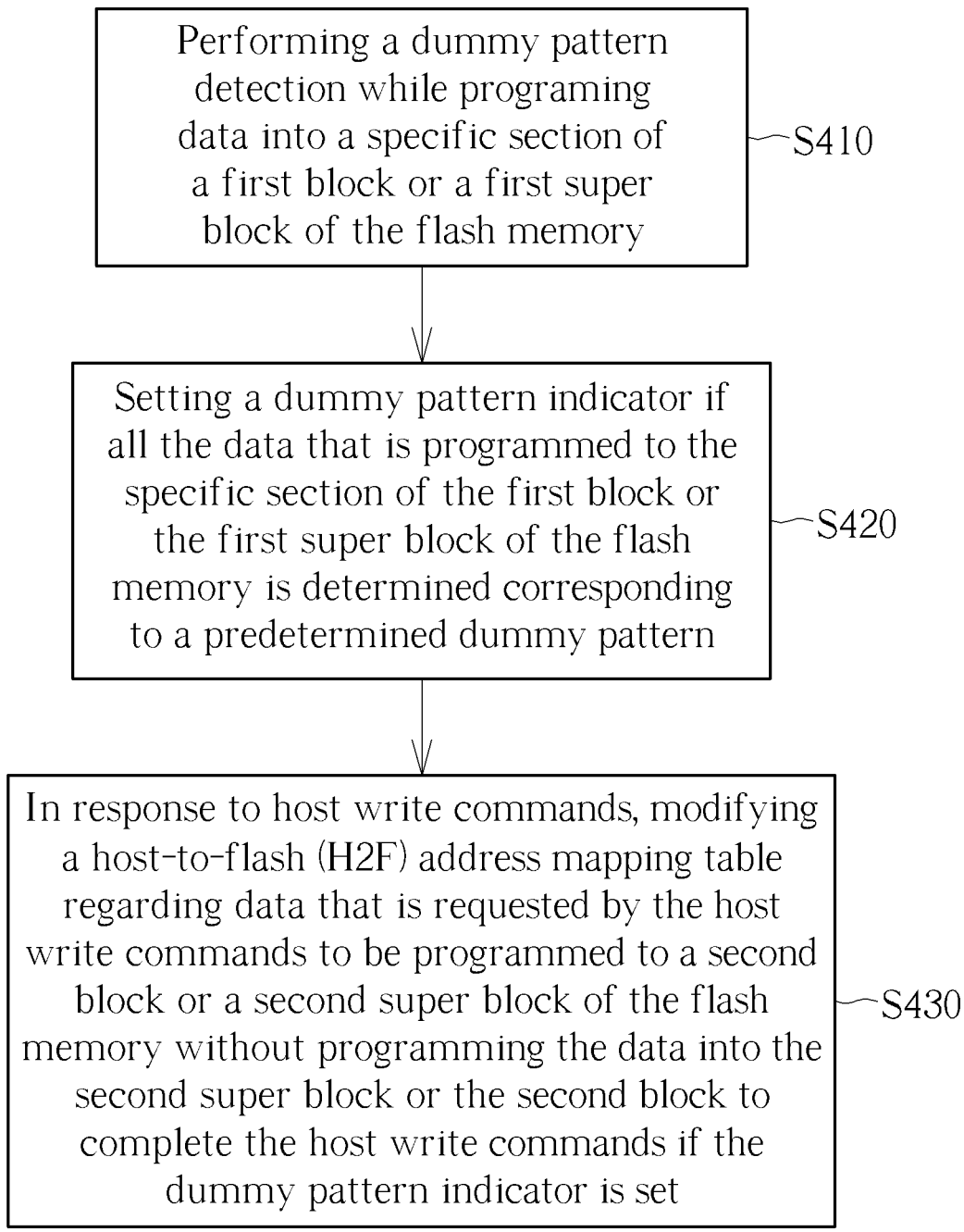
FIG. 5 illustrates a flow of a method of handling host write commands according to one embodiment of the present invention.

FIG. 5 illustrates a method of handling host write commands for a flash memory. As shown in the figure, the method of the present invention includes the following simplified flow:

Step S410: performing a dummy pattern detection while programing data into a specific section of a first block or a first super block of the flash memory;

Step S420: setting a dummy pattern indicator if all the data that is programmed to the specific section of the first block or the first super block of the flash memory is determined corresponding to a predetermined dummy pattern; and Step S430: in response to host write commands, modifying a host-to-flash (H2F) address mapping table regarding data that is requested by the host write commands to be programmed to a second block or a second super block of the flash memory without programming the data into the second super block or the second block to complete the host write commands if the dummy pattern indicator is set.

Since principles and specific details of the foregoing steps have been explained in detail through the above embodiments, further descriptions will not be repeated here. It should be noted that the above flow may be possible, by adding other extra steps or making appropriate modifications and adjustments, to better improve flexibility and further improve efficiency of handling host write commands. Furthermore, all the operations set forth in the above embodiments can be implemented by the memory controller 110 shown in FIG. 1.

In conclusion, the method and the mechanism provided by the present invention can effectively complete host write commands that are associated with writing dummy patterns to the flash memory. Also, method and the mechanism provided by the present invention life by avoiding writing dummy patterns to the flash memory.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function (s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for use in a flash memory to handle host write commands, comprising:
    performing a dummy pattern detection while programing data into a specific section of a first block or a first super block of the flash memory;
    setting a dummy pattern indicator if all the data that is programmed to the specific section of the first block or the first super block of the flash memory is determined corresponding to a predetermined dummy pattern; and
    in response to host write commands, modifying a host-to-flash (H2F) address mapping table regarding data that is requested by the host write commands to be programmed to a second block or a second super block of the flash memory without programming the data into the second super block or the second block to complete the host write commands if the dummy pattern indicator is set.

2. The method of claim 1, wherein each of the first block/the first super block and the second block/the second super block has a plurality of sections, and the specific section is a last one of the plurality of sections.

3. The method of claim 1, further comprising:
checking whether data in a write buffer corresponds to the predetermined dummy pattern each time a flash-to-host address (F2H) address mapping group of a F2H address mapping table is flushed to the flash memory; and
determining all the data that is programmed to the specific section corresponds to the predetermined dummy pattern if it is confirmed that the data in the write buffer corresponds to the predetermined dummy pattern each time the F2H address mapping group is flushed to the flash memory.

4. The method of claim 3, further comprising:
confirming that the data in the write buffer corresponds to the predetermined dummy pattern if all the data in the write buffer has a value of 0 or 0xFF.

5. The method of claim 3, further comprising:
programing data to the specific section of the first blocks or the first super blocks even if it is confirmed the data in the write buffer corresponds to the predetermined dummy pattern each time the F2H address mapping group is flushed to the flash memory.

6. The method of claim 1, further comprising:
before modifying the H2F address mapping table, checking the H2F address mapping table to determine whether one or more H2F address mapping entries that data requested to be programmed corresponds to has physical addresses; and
not to modifying the H2F address mapping table if the one or more H2F address mapping entries that data requested to be programmed corresponds to does not have physical address.

7. The method of claim 1, wherein the step of modifying the H2F address mapping table regarding data that is requested by the host write commands to be programmed comprises:
checking if a portion of data that is requested to be programmed by the host write commands corresponds to the predetermined dummy pattern when the portion of data is stored in a write buffer; and
modifying the H2F address mapping table regarding the data that is requested by the host write commands only if the portion of the data in the write buffer corresponds to the dummy pattern.

8. A memory controller for use in a flash memory to control the flash memory and handle host write commands to the flash memory, comprising:
a storage unit, arranged to store information and program codes;
a processing unit, operable to execute the program codes to be arranged to:
performing a dummy pattern detection while programing data into a specific section of a first block or a first super block of the flash memory;
setting a dummy pattern indicator if all the data that is programmed to the specific section of the first block or the first super block of the flash memory corresponds to a predetermined dummy pattern; and
in response to host write commands, modifying a host-to-flash (H2F) address mapping table regarding data that is requested by the host write commands to be programmed to a second block or a second super block of the flash memory without programming the data into the second super block or the second block to complete the host write commands if the dummy pattern indicator is set.

9. The memory controller of claim 8, wherein each of the first block/the first super block and the second block/the second super block has a plurality of sections, and the specific section is a last one of the plurality of sections.

10. The memory controller of claim 8, wherein the processing unit is arranged to:
check whether data in a write buffer corresponds to the predetermined dummy pattern each time a flash-to-host address (F2H) address mapping group of a F2H address mapping table is flushed to the flash memory; and
determine all the data that is programmed to the specific section corresponds to the predetermined dummy pattern if it is confirmed that the data in the write buffer corresponds to the predetermined dummy pattern each time the F2H address mapping group is flushed to the flash memory.

11. The memory controller of claim 10, wherein the processing unit is arranged to confirm that the data in the write buffer corresponds to the predetermined dummy pattern if all the data in the write buffer has a value of 0 or 0xFF.

12. The memory controller of claim 10, wherein the processing unit is arranged to:
program data to the specific section of the first blocks or the first super blocks even if it is confirmed the data in the write buffer corresponds to the predetermined dummy pattern each time the F2H address mapping group is flushed to the flash memory.

13. The memory controller of claim 8, wherein the processing unit is arranged to:
before modifying the H2F address mapping table, check the H2F address mapping table to determine whether one or more H2F address mapping entries that data requested to be programmed corresponds to has physical addresses; and
not to modify the H2F address mapping table if the one or more H2F address mapping entries that data requested to be programmed corresponds to does not have physical address.

14. The memory controller of claim 8, wherein the wherein the processing unit is arranged to:
check if a portion of data that is requested to be programmed the host write commands corresponds to the predetermined dummy pattern when the portion of data is stored in a write buffer; and
modify the H2F address mapping table regarding the data that is requested by the host write commands only if the portion of the data in the write buffer corresponds to the predetermined dummy pattern.

15. A storage system, comprising:
a flash memory; and
a memory controller for use in a flash memory to control the flash memory and handle host write commands to the flash memory, the controller arranged to:
perform a dummy pattern detection while programing data into a specific section of a first block or a first super block of the flash memory;
set a dummy pattern indicator if all the data that is programmed to the specific section of the first block or the first super block of the flash memory corresponds to a predetermined dummy pattern;

in response to host write commands, modify a host-to-flash (H2F) address mapping table regarding data that is requested by the host write commands to be programmed to a second block or a second super block of the flash memory without programming the data into the second super block or the second block to complete the host write commands if the dummy pattern indicator is set.

* * * * *